United States Patent [19]

Sunshine

[11] Patent Number: 4,950,004
[45] Date of Patent: Aug. 21, 1990

[54] BICYCLE CHAIR

[76] Inventor: William N. Sunshine, 5631 Reamer, Houston, Tex. 77096

[21] Appl. No.: 332,544

[22] Filed: Apr. 3, 1989

[51] Int. Cl.⁵ .................................................. A47C 7/02
[52] U.S. Cl. ....................................... 297/452; 297/195
[58] Field of Search ........................ 297/452, 195, 264

[56] References Cited

U.S. PATENT DOCUMENTS

| | | |
|---|---|---|
| 294,645 | 3/1884 | Lillibridge . |
| 337,171 | 3/1886 | Lillibridge . |
| 536,013 | 3/1895 | Buckley . |
| 544,625 | 8/1895 | Montague . |
| 644,686 | 3/1900 | Runyan et al. .................. 297/195 X |
| 989,966 | 4/1911 | Hayden ................................ 297/195 |
| 1,006,331 | 10/1911 | Williamson . |
| 1,587,705 | 6/1926 | Dozier . |
| 2,699,201 | 1/1955 | Levy . |
| 2,3353,220 | 7/1944 | Charlop . |
| 3,874,730 | 4/1975 | Marchello . |
| 4,176,880 | 12/1979 | Marchello . |
| 4,387,925 | 6/1983 | Barker et al. ....................... 297/195 |
| 4,568,121 | 2/1986 | Kashima .............................. 297/195 |
| 4,613,187 | 9/1986 | Gordon ................................ 297/452 |
| 4,775,705 | 9/1988 | Terranova ........................... 297/195 |
| 4,783,119 | 11/1988 | Moses .................................. 297/195 |

Primary Examiner—Laurie K. Cramner
Attorney, Agent, or Firm—Gunn, Lee & Miller

[57] ABSTRACT

A bicycle chair for mounting to a conventional bicycle frame formed by a chair bracket and a chair pad frame angularly mounted thereon. The chair pad frame supports a chair pad extending between arms of said chair pad frame for fully supporting a bicycle rider.

10 Claims, 1 Drawing Sheet

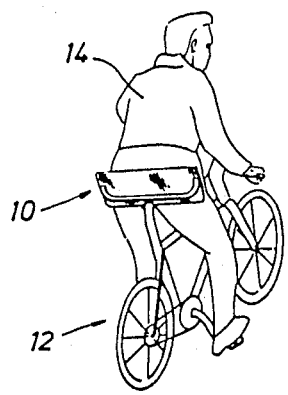
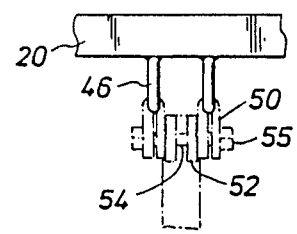
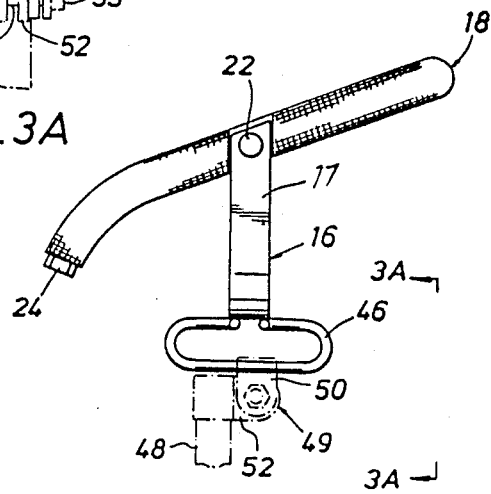
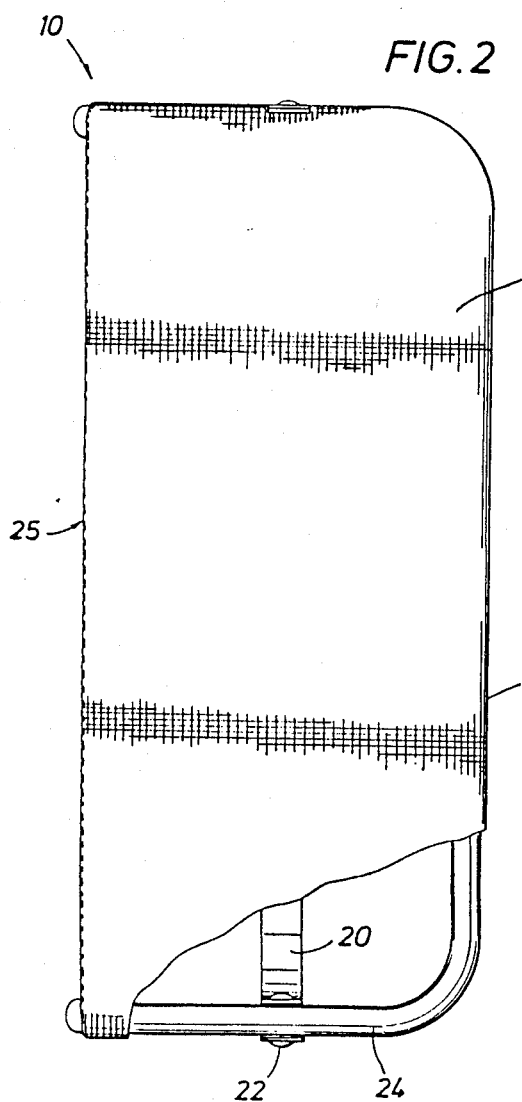
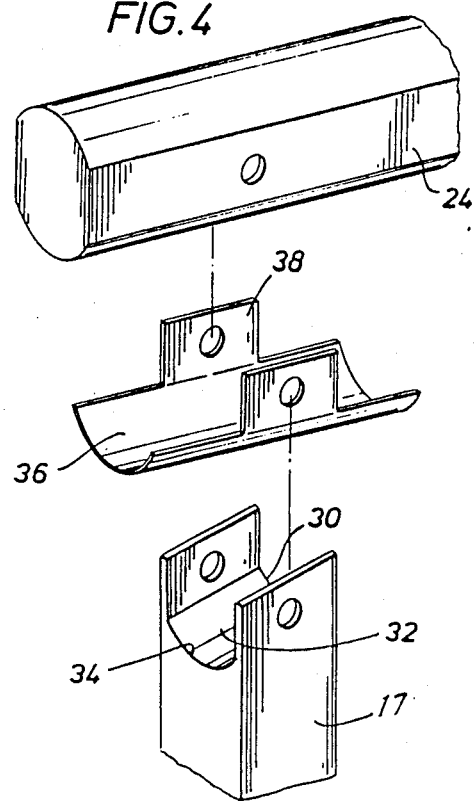

4,950,004

BICYCLE CHAIR

BACKGROUND OF THE DISCLOSURE

The present invention is directed to a bicycle chair, particularly, to a bicycle chair which provides a substantially larger sitting and support area than is provided by a conventional bicycle seat.

The conventional bicycle seat is relatively small and does not provide sufficient support to comfortably support all the weight of a rider, particularly, an adult rider. On a conventional bicycle seat, the entire weight of the rider is concentrated on a relatively small area of the rider's crotch, which often causes discomfort. Bicycle seats have changed over the years as efforts have been made to provide a more comfortable ride. While bicycle seats have been padded and provided with springs to cushion the ride, the size and shape of the bicycle seat over the years has remained substantially the same. The conventional bicycle seat presents a profile which is substantially triangular in shape. Over the years, the bicycle seat has been available in varying sizes, however, the triangular shape has not varied appreciably.

Some efforts have been made to provide a more comfortable bicycle seat. In U.S. Pat. No. 4,176,880 a hammock type bicycle seat is disclosed. The hammock type bicycle seat comprises webbing or a pad supported by a U-shaped seat frame. The pad or hammock spans across the seat frame and is connected to the upstanding legs thereof.

A significant disadvantage of the hammock style bicycle seat is that it is designed to pivot and rock backwards and forwards upon the movement of the rider's legs when peddling. The rider, therefore, tends to slip off of the hammock style bicycle seat. In an effort to overcome this problem, the hammock pad in U.S. Pat. No. 4,176,880 is covered by a frictionally roughened surface and sectioned into several pieces.

The bicycle chair of the present disclosure overcomes the disadvantages associated with the conventional triangular bicycle chair and of the hammock style bicycle seat by providing a bicycle chair which comfortably supports the weight of a rider on a broad non-pivotal chair pad mounted on the frame of a bicycle. The bicycle chair of the present disclosure is designed to provide both stability and to fully support the rider's buttocks and upper leg areas. The chair effectively disperses the entire weight of the rider over the broad area of the buttocks and upper leg areas in a manner similar to a conventional chair providing significant rider comfort.

SUMMARY OF THE INVENTION

The invention of the present disclosure is directed to a bicycle chair comprising a chair frame assembly mountable on a standard bicycle frame. The chair frame assembly includes a chair pad frame rigidly connected to a chair frame bracket. The chair pad is mounted on the chair frame and spans the area between the chair frame arm members which define the depth and width of the bicycle chair of the invention. The front area of the chair pad and the chair pad frame is designed to slope gradually downward. This design aspect allows the rider's legs to pump the bicycle pedals while at the same time maintaining support for the rider's weight.

DETAILED DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is an illustrated view of the bicycle chair of the invention on a bicycle with a rider thereon;

FIG. 2 is a partially broken away top plan view of the bicycle chair of the invention;

FIG. 3 is a side view of the bicycle chair of the invention;

FIG. 4 is a cut-away exploded view of the connection between the chair pad frame and chair bracket.

DETAILED DESCRIPTION OF THE INVENTION

Referring first to FIG. 1, the bicycle chair of the invention, generally identified by the reference numeral 10, is shown mounted to a standard or conventional bicycle frame 12. The chair 10 is mounted to the bicycle frame 12 in the usual and conventional manner so that it provides support for a rider 14. The chair 10 does not interfere with the usual and customary operation of the bicycle 12. In fact, it provides a comfortable support for the rider 14.

Referring now to FIGS. 2 and 3, the bicycle chair 10 of the invention includes a chair bracket 16 and chair pad frame 18. The chair bracket 16 is formed of square tubing having opposite ends extending upwardly to form legs 18 connected by a horizontal bracket member 20 to form the substantially U-shaped chair bracket 16. The chair frame 18 is rigidly secured to the chair bracket 16 by bolts 22 extending through the upper ends of the legs 18 and through the chair frame arm 24.

The chair pad frame 18 is preferably formed of aluminum. It is understood however that the chair pad frame 18 and the chair bracket 16 may be formed of any suitable material having sufficient strength to support a rider 14. The aluminum bar forming the chair frame 18 is substantially rectangular in cross-section as best shown in FIG. 4 and will be described in greater detail herein.

The aluminum rod forming the chair frame 18 includes a horizontal base member 23 terminating at each end thereof in arms 24 which are substantially perpendicular to the base member 23. The forward end portion of the arms 24 are angled downwardly approximately 45° as shown in FIG. 3.

Referring now to FIG. 4, the connection between the chair bracket 16 and chair frame 18 is shown in greater detail. As will be observed from the view of the chair 10 in FIG. 3, the chair frame 18 is mounted to the chair bracket 16 at an angle so that the chair pad is tilted forwardly. The chair pad is tilted forwardly at a relatively small angle so that the rider 14 does not slide off the chair pad. It is desirable however that the chair pad be tilted as shown so that the forward edge of the chair pad does not interfere with the rider's legs when pedaling the bicycle. To maintain the angle of inclination, the ends of the legs 18 are notched to form a recess 32 matching the profile of the arms 24 of the chair pad 18. The back edge 30 of the recess 32 is higher than the front edge 34 so that the chair pad frame 18 may be tilted forward as shown in FIG. 3. Upon assembly, a steel shim 36 is inserted in the recess 32 between the leg 18 and the arm 24. The shim 36 aids in establishing a rigid and secure connection between the leg 18 and arm 24. The shim 36 acts as a wear surface between the edges 30, 34 defining the recess 32 and the arm 24 of the chair pad frame 18. The shim 36 is provided with upstanding tabs 38 which have a hole extending therethrough for alignment with holes formed in the legs 18 and arms 24 for receiving the bolt 22 therethrough. Upon completion of the assembly of the bicycle chair 10, the chair frame 18 is securely attached to the bracket frame 16 by the bolt 22.

The chair pad 25 comprises a sheet of material 40 forming a loop about the arms 24 of the chair pad frame 18. The material 40 is tightly looped about the arms 24 and while it is flexible so that it gives or stretches slightly with the rider's weight, the material 40 does not easily stretch out of shape. Additional cushioning is provided by foam or other resilient material which is received within the loop formed by the chair material 40. It will be observed that the chair pad 25 extends to the forward edge of the arms 24 so as to present a-pad surface which is inclined downwardly at an angle which is more acute than the angle of inclination of the chair frame 18. The downwardly inclined forward portion of the chair pad 25 adds to the comfort of the bicycle chair 10 by presenting an inclined surface so that the forward edge of the chair pad 25 does not cut into the back of the rider's thighs when riding the bicycle.

The bicycle chair 10 of the invention may be mounted to any conventional bicycle frame in the customary manner. A conventional post clamp 46 is welded or otherwise mounted to the horizontal frame member 20 of the chair bracket 16 at the mid point thereof. The clamp 46 is fastened to the chair post 48 of the bicycle by a clamping assembly 49. The clamping assembly 49 is shown in FIGS. 3 and 3A and comprises a pair of U-shaped brackets 50 and a clamp collar 52. The brackets 50 clamp about the post clamp 46 for mounting the bicycle chair 10 to the chair post 48. A bolt 54 extends through the brackets 50 and clamp collar 52 and is locked on by a lock nut 55 for securely mounting the bicycle chair 10 to chair post 48. The brackets 50 and clamp collar 52 include a plurality of radially extending serrations or notches which cooperatively engage to angularly position the bicycle chair 10 relative to the chair post 48. Loosening of the bolt 54 permits the brackets 50 to be rotated relative to the clamping collar 54 so that the bicycle chair 10 may be tilted to a desired angle. Additionally the bicycle chair 10 is adjustable horizontally along the brackets 50 so that the bicycle chair 10 may be moved toward or away from the handle bars of the bicycle as desired. The bicycle chair 10 of the invention may thus be positioned for the desired comfort of the rider. In use, the chair 10 of the invention provides a comfortable riding surface for the rider 14 by dispersing the entire weight of the rider over a broad area defined by the chair pad 25 without impairing the use or operability of the bicycle.

While the foregoing is directed to the preferred embodiment of the present invention, other and further embodiments of the invention may be devised without departing from the basic scope thereof, and the scope thereof is determined by the claims which follow.

What is claimed is:

1. A bicycle chair for mounting on a bicycle frame, comprising:
   (a) a substantially U-shaped chair bracket formed by a horizontal base member terminating in substantially parallel upstanding leg members at each end thereof;
   (b) a chair pad frame fixedly mounted to said chair bracket and retained thereon in a forwardly inclined position, said chair pad frame supporting a transversely extending chair pad for supporting a rider thereon;
   (c) shim means positioned at the juncture of said chair pad frame and said chair bracket for forming a rigid connection therebetween; and
   (d) clamp means for mounting the bicycle chair on the mounting post of the bicycle.

2. The bicycle chair of claim 1 wherein said leg members of said chair bracket are angularly notched at the exposed ends thereof for receiving said chair pad frame and supporting said chair pad frame at an inclined angle relative to said chair bracket.

3. The bicycle chair of claim 2 wherein said shim means comprises steel shims inserted within the notched ends of said leg members between said chair bracket and said chair pad frame.

4. The bicycle chair of claim 3 wherein said chair pad frame is substantially rectangular in cross-section.

5. The bicycle chair of claim 3 wherein said steel shims include upstanding tabs having a hole extending therethrough for alignment with holes formed through said leg members of said chair bracket and said chair pad frame for receiving connector means therethrough for mounting said chair pad frame to said chair bracket.

6. The bicycle chair of claim 1 wherein said chair pad frame comprises a horizontal base member having a pair of arms extending forwardly therefrom, said arms are substantially parallel to each other and include a forward position which is angled downwardly.

7. The bicycle chair of claim 4 wherein said chair pad is formed by a sheet of material looped about said arms of said chair pad frame and including a forwardly inclined portion.

8. The bicycle chair of claim 4 wherein said forward portion of said chair pad frame arms are angled downwardly at approximately 45°.

9. The bicycle chair of claim 1, including a clamping assembly for mounting said bicycle chair on the bicycle frame, said clamping assembly permitting said bicycle chair to be angularly adjustable.

10. The bicycle chair of claim 9 wherein said clamping assembly comprises a pair of U-shaped brackets and a clamp collar cooperatively engaged for mounting said bicycle chair on the bicycle frame, said brackets and clamp collar permitting angular and horizontal adjustment of said bicycle chair.

* * * * *